(12) United States Patent
Aamodt et al.

(10) Patent No.: US 7,335,440 B2
(45) Date of Patent: Feb. 26, 2008

(54) LITHIUM-LIMITED ANODE SUBASSEMBLY WITH SOLID ANODE CURRENT COLLECTOR AND SPACER

(75) Inventors: Paul B. Aamodt, Richfield, MN (US); Karl E. Hokanson, Coon Rapids, MN (US); Sonja K. Somdahl, Minneapolis, MN (US); Craig L. Schmidt, Eagan, MN (US); Joseph J. Viavattine, Vadnais Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 685 days.

(21) Appl. No.: 10/661,920

(22) Filed: Sep. 12, 2003

(65) Prior Publication Data

US 2005/0058894 A1    Mar. 17, 2005

(51) Int. Cl.
*H01M 2/14*      (2006.01)
*H01M 4/40*      (2006.01)
*H01M 4/66*      (2006.01)
*H01M 4/70*      (2006.01)

(52) U.S. Cl. ................. 429/94; 429/128; 429/136; 429/231.95; 429/233; 429/245

(58) Field of Classification Search ............ None
See application file for complete search history.

(56) References Cited

U.S. PATENT DOCUMENTS

| | | | |
|---|---|---|---|
| 4,333,994 A * | 6/1982 | Urry ................... | 429/94 |
| 5,217,827 A * | 6/1993 | Fauteux et al. ............ | 429/310 |
| 5,458,997 A | 10/1995 | Crespi et al. ............ | 429/219 |
| 5,486,215 A | 1/1996 | Kelm et al. ............ | 29/623.1 |
| 5,591,544 A | 1/1997 | Fauteux et al. ............ | 429/209 |
| 5,631,102 A | 5/1997 | Spillman et al. ........... | 429/94 |
| 6,051,038 A | 4/2000 | Howard et al. ............ | 29/623.1 |
| 6,110,622 A | 8/2000 | Frysz et al. ............ | 429/233 |
| 6,391,488 B1 * | 5/2002 | Shimizu et al. ............ | 429/94 |
| 6,805,719 B2 * | 10/2004 | Aamodt et al. ............ | 29/623.1 |
| 6,869,723 B2 * | 3/2005 | Yamaguchi ............ | 429/94 |
| 2002/0061449 A1 * | 5/2002 | Maruo et al. ............ | 429/303 |
| 2003/0027051 A1 * | 2/2003 | Kejha et al. ............ | 429/233 |
| 2004/0064163 A1 | 4/2004 | Aamodt et al. ............ | 607/36 |

* cited by examiner

*Primary Examiner*—Jonathan Crepeau
(74) *Attorney, Agent, or Firm*—Paul H. McDowall; Steve Bauer

(57) ABSTRACT

An anode subassembly for use in an implantable electrochemical cell includes a solid anode current collector and an alkali metal anode pressed onto the solid anode current collector such that the solid anode current collector is located on the outer side of the outermost winding of a coiled electrode assembly formed when the anode subassembly is wound with a cathode subassembly. The anode subassembly may further include a spacer formed from a microporous, non-conductive material pressed onto the alkali metal anode on the opposite side from the solid anode current collector.

15 Claims, 5 Drawing Sheets

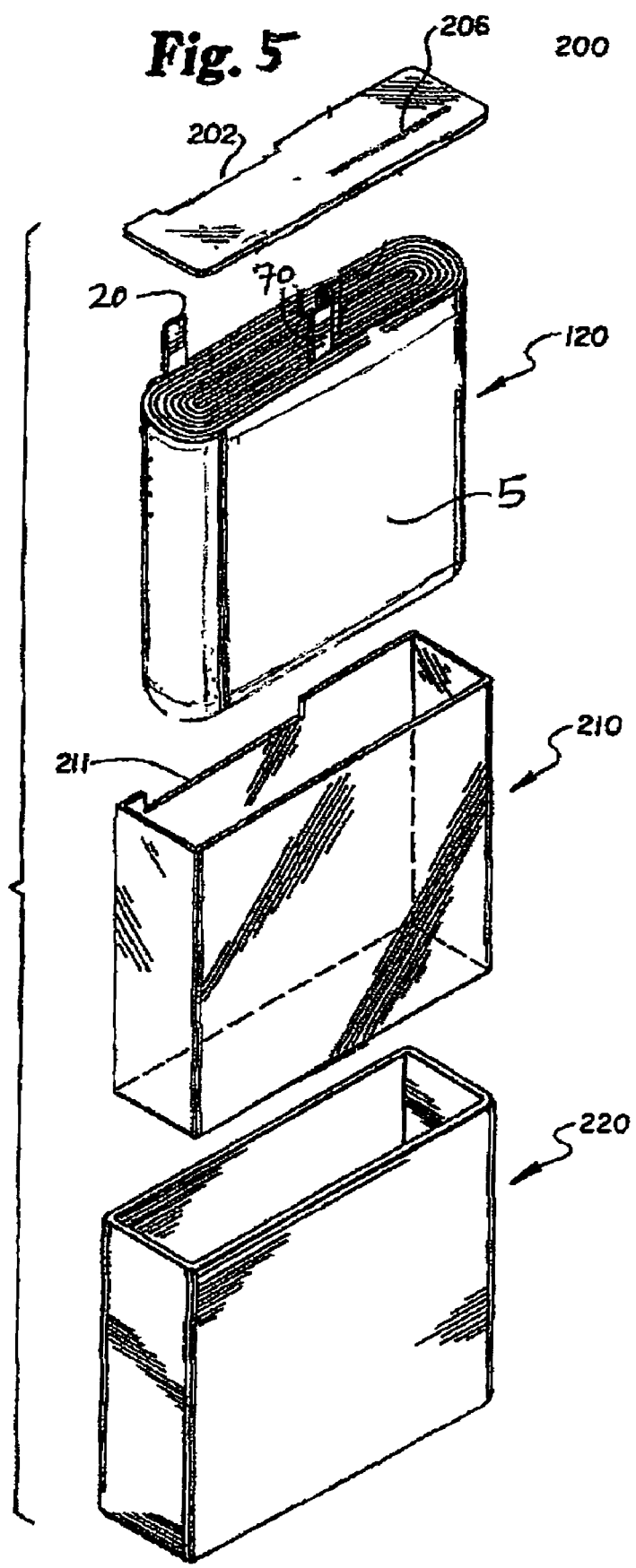

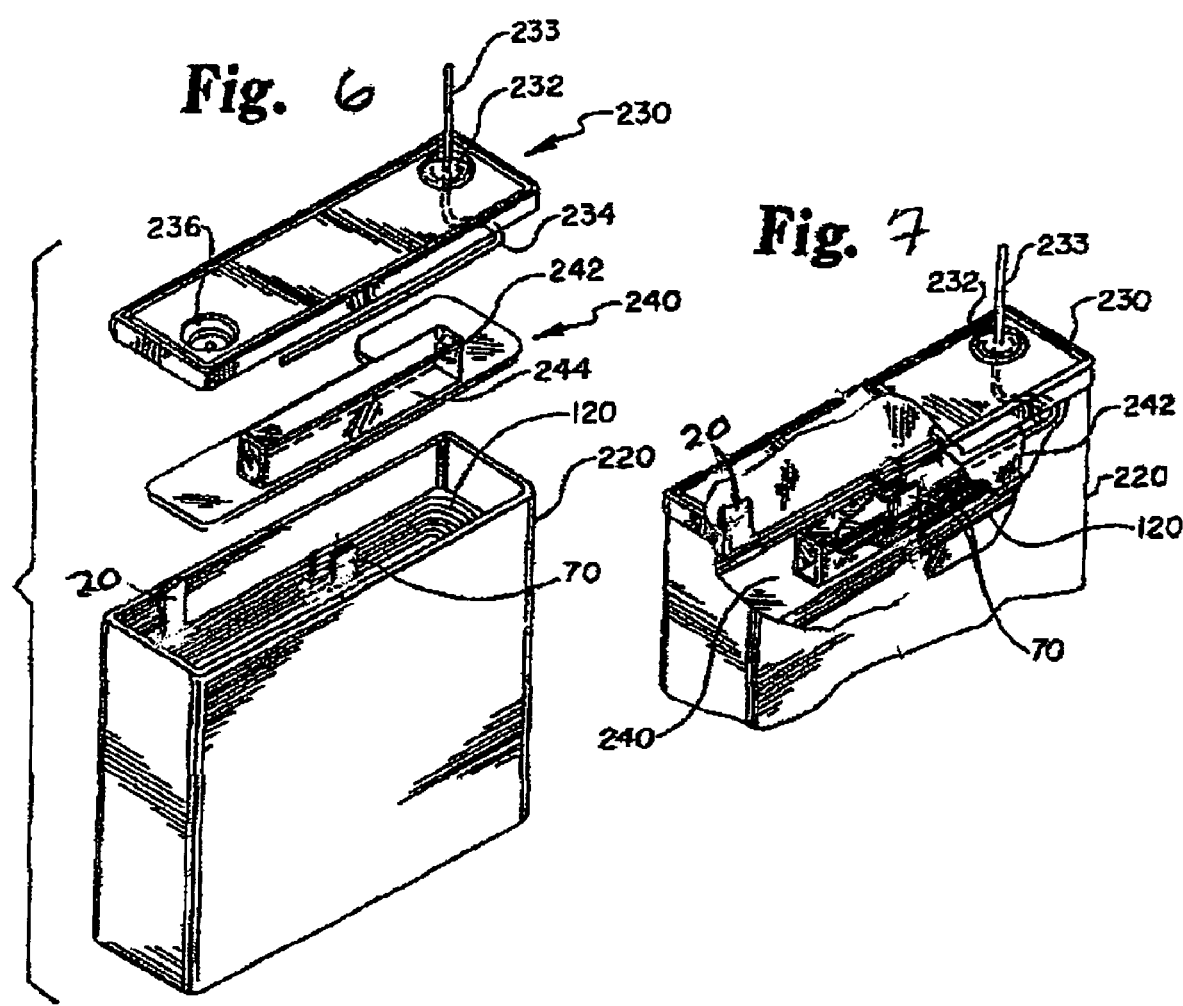

LITHIUM-LIMITED ANODE SUBASSEMBLY WITH SOLID ANODE CURRENT COLLECTOR AND SPACER

CROSS REFERENCE TO RELATED APPLICATIONS

This application cross-references two co-pending non-provisional U.S. patent applications filed on even date herewith; namely, application Ser. No. 10/661,666 entitled, "Spacer Separator Subassembly" and application Ser. No. 10/661,909 entitled, "Lithium-Limited Anode Assembly" the contents of both are hereby incorporated by reference.

FIELD OF THE INVENTION

The present invention relates to the field of electrochemical cells, and, more particularly, the present invention relates to an anode subassembly for use in implantable electrochemical cells.

BACKGROUND OF THE INVENTION

Implantable cardiac stimulation devices, such as defibrillators and pacemakers, are used to treat patients suffering from cardiac arrhythmias or other cardiac dysfunction. In operation, such devices may continuously monitor the electrical activity of the heart and deliver appropriate stimulation therapies to normalize electrical or mechanical dysfunction. Cardiac stimulation devices must possess low self-discharge in order to have a useful life of many months, and must be highly reliable to provide a needed therapy whenever necessary. In implantable defibrillators, the power source must have a high rate capability to provide the necessary charge to the capacitors for delivering high-energy shocks. In addition, since cardiac stimulation devices are implanted, the battery must be able to supply energy from a minimum packaged volume.

Batteries or electrochemical cells are volumetrically constrained systems. The size or volume of components that go into a battery (cathode, anode, separator, current collectors, electrolyte, etc.) cannot exceed the available volume of the battery case. In addition, the appropriate amount of some components depends on the amount of other components that are used. These components must be "balanced" to provide discharge to the extent desired.

In a conventional cathode limited battery such as a lithium-silver vanadium oxide (LiSVO) battery commonly used in cardiac stimulation devices, the capacity ($Q_+$) of the cathode must not exceed the capacity ($Q_-$) of the anode. Cathode limited cells have been used in battery powered implantable medical devices such as heart pacemakers because of the proven reliability of their discharge over the long periods during which they are implanted. The volume occupied by the other battery components also depends on the cathode capacity ($Q_+$) as reflected by the amount of cathode material in the battery. The amount of electrolyte depends on the amount of cathode material and the amount of it to be discharged since the cathode material swells as the battery is discharged and requires more electrolyte to fill the additional cathode volume. The volume of the separator and current collector depends on the area of the electrodes. The area of the electrodes depends on the area required for consistent pulse output as the battery is discharged. All of these components must be adjusted for a given battery volume.

One method for constructing a lithium anode cell is to wind cathode and anode elements together to form a cylindrical or oblong coil. In a coiled design, anode material is available on either side of the cathode windings and will deplete into the cathode as the battery is discharged. Reliable performance is assured by having an excess of anode capacity beyond the usable capacity desired of the cathode. This excess lithium is distributed through the length of the anode. The lithium winding forming the outermost winding of the coil has cathode material adjacent to its inner circumference but not on the outer circumference. Therefore the outermost winding of the anode need only be half the thickness of the inner windings. If an anode is constructed from a single piece of foil that is of uniform thickness, there is an additional excess of lithium on the outermost winding of the coil.

One disadvantage of a cathode-limited cell is that the excess lithium in the cell may reduce other materials after the cathode is fully discharged, which can lead to cell swelling. In order to prevent damage to circuitry within the implantable device surrounding the cell due to cell swelling, a reinforcing stainless steel plate may be provided against the cell. This stainless steel plate occupies valuable space in an implantable device and adds weight to the overall device. In regard to implantable medical devices, a reduced size and weight is desirable to ease the implant procedure and avoid patient discomfort at the implant site. Eliminating the excess lithium or the need for the stainless steel plate would allow the cell size, and therefore the overall size of the medical device, to be reduced. Alternatively, the volume occupied by excess lithium and the steel plate could otherwise be taken up by cathode material to increase the battery capacity.

Another disadvantage of a cathode-limited cell is that its resistance increases as a function of time after the cell is discharged to the second voltage plateau on its discharge curve. By limiting the amount of lithium and electrolyte material in the cell, the cell may be designed to utilize only the first voltage plateau. Superior long-term cell performance can be achieved since the same useful capacity can be provided as in a conventionally balanced cell but at a higher voltage toward the end of the discharge cycle. A lithium-limited balanced cell having these advantages is disclosed in U.S. Pat. No. 5,458,997 to Crespi et al, incorporated herein by reference in its entirety.

In a coiled, anode-limited cell it is desirable to reduce the excess anode material present in the outermost winding that does not interface cathode material on both sides. One method for manufacturing an anode-limited cell that eliminates the excess anode material involves layering two lithium foil pieces. One lithium foil is provided long enough to form all of the windings in a coil, and the other lithium foil is provided long enough to form only the inner windings. When the two foils are overlaid and coiled with a cathode, the inner coil windings are formed by a double layer of lithium foil and the outermost winding by a single layer of lithium foil.

Another method for reducing excess lithium in an anode-limited cell is disclosed in commonly-assigned U.S. patent application Ser. No. 10/123,495 now U.S. Pat. No. 6,805,719 filed 15, Apr. 2002 and entitled, "Balanced Anode Electrode" invented by Aamodt et al. and incorporated herein by reference in its entirety. The disclosed method utilizes a short, thin lithium foil joined to a long, thick lithium foil such that the shorter, thinner foil will form the outermost coil winding and the longer thicker foil will form all of the inner windings. This method advantageously provides a narrow tolerance of the anode material for fully gaining the benefits of an anode-limited cell.

The anode current collector is commonly provided as a perforated conductive material such as a nickel or titanium grid. During assembly, the anode current collector is pressed against the anode material such that the anode material becomes enmeshed with the openings in the anode current collector. In this way, the openings in the anode current collector grid act to strengthen the mechanical joint between the current collector and the anode material and prevent separation of these components. The anode current collector further acts to provide reinforcement to the thin lithium layer in the outermost winding.

A limitation exists, however, in coiled, anode-limited cells of this type relating to the potential for a short between the cathode material and the anode current collector. When the thin layer of lithium has substantially depleted into the cathode in the outermost winding, the cathode may press into the anode current collector potentially causing a short.

The anode current collector may extend the length of the coil windings or be positioned only on the outermost coil winding. The inventors of the present invention have discovered that, when the anode material becomes depleted toward the end of cell discharge, the cathode material may press against the anode current collector. Cracks that naturally occur in the cathode material create exposed edges of the cathode material that can press against the edges of the perforations or holes in the anode current collector grid, particularly in the final turn of the outermost winding of a coiled electrode assembly. Even if a separator material is present between the cathode and anode subassemblies, the separator material may tear when pressed between a cathode crack edge and an anode current collector edge. The possibility exists, therefore, for a short to occur between the cathode material and anode current collector causing the battery to fail unexpectedly.

Though this failure mechanism is expected to be highly infrequent, it could result in potentially serious consequences for a patient having an implanted device. Thus, an improved anode subassembly design is warranted which overcomes the potential failure mechanism described above, particularly in anode-limited cells but potentially in any cell in which cathode cracking may precipitate a short between the cathode and anode.

BRIEF SUMMARY OF THE INVENTION

The present invention addresses the limitations described above by providing an electrochemical cell having an anode subassembly that includes a solid anode current collector. The electrochemical cell includes an electrode assembly formed by coiling, folding or wrapping an anode subassembly and a cathode subassembly.

The anode subassembly includes the solid anode current collector pressed against an alkali metal anode to form a secure attachment between the anode current collector and anode material. The anode subassembly may further include a spacer formed from a film of microporous, non-conductive material for providing a protective barrier between the anode material and cathode material and, more particularly, between the cathode material and the anode current collector when the anode material becomes depleted in an anode-limited cell. The spacer is preferably pressed onto the alkali metal anode on the side opposite the anode current collector. The spacer extends at least the length of the anode current collector, which may extend the length of the outermost coil winding and may optionally extend further into the inner coil windings.

BRIEF DESCRIPTION OF THE DRAWINGS

FIG. 5 is an exploded perspective view showing the insertion of the electrode assembly shown in FIG. 3 in a battery case together with insulator materials.

FIG. 6 is an exploded perspective view showing the application of the insulator and case top to the case and electrode assembly shown in FIG. 5.

FIG. 7 is a partially cut-away perspective view of the completed battery showing the connection of the electrode assembly connector tabs with the case elements.

DETAILED DESCRIPTION OF THE PREFERRED EMBODIMENTS

The present invention is aimed at providing an improved anode subassembly for use in an implantable electrochemical cell that is designed to prevent cell failure due to shorting between the cathode material and the anode current collector when the anode material becomes depleted. The benefits of the present invention may be realized in anode-limited cells wherein the anode becomes depleted before the cathode. However, it is expected that the benefits of the present invention may also be realized in cathode-limited cells wherein cracks in the cathode material, in particular in cells having relatively thick cathode material, may lead to shorting between the cathode and anode.

While a variety of battery configurations and constructions are possible for anode- or cathode-limited cells, the methods included in the present invention are particularly suited for batteries having folded, coiled or wrapped electrode configurations, such as the batteries disclosed in U.S. Pat. No. 5,486,215 issued to Kelm et al., and U.S. Pat. No. 6,051,038 issued to Howard et al, both patents incorporated herein by reference in their entirety.

Figure 1A:
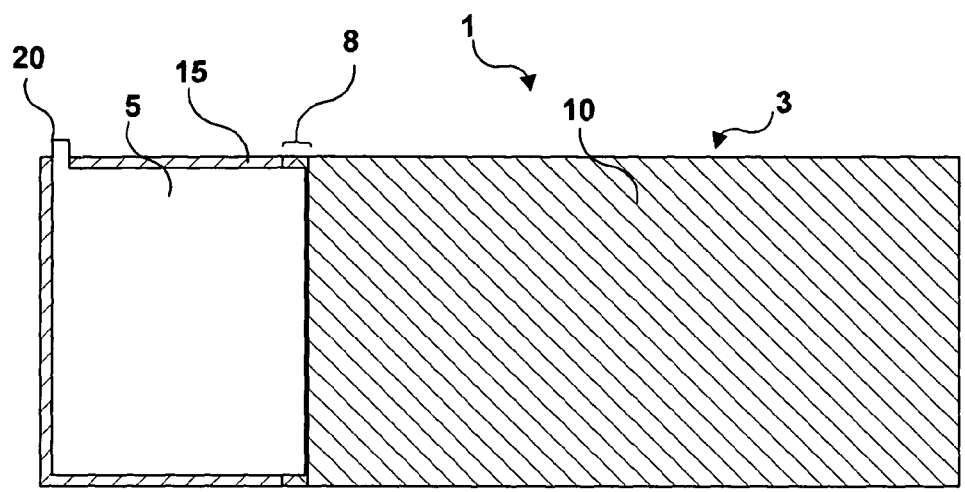
FIGS. 1A through 1C are top plan views of an anode subassembly, provided by the present invention, having a solid anode current collector and showing various arrangements of an alkali metal anode for use in an anode-limited electrochemical cell.

FIG. 1A is a top plan view of an anode subassembly 1 to be included in an electrochemical cell according to one embodiment of the present invention. The anode subassembly 1 includes a solid anode current collector 5 attached to an alkali metal anode 3 formed from two pieces of anode material, 10 and 15. The anode current collector 5 is a flat, solid piece of conductive metal that is corrosion-resistant when associated with the alkali metal pieces 10 and 15. The anode current collector 5 is preferably fabricated from titanium, nickel, copper or an alloy of nickel or copper. One or more connector tabs 20 may project from anode current collector 5 to allow anode connection to a desired battery terminal.

In FIG. 1A, the alkali metal anode 3 is formed from an elongated piece of alkali metal 10 conjoined to a shorter and thinner piece of alkali metal 15. The alkali metal pieces 10 and 15 are preferably foils formed of lithium metal or an alloy of lithium. The two foil pieces 10 and 15 are partially overlapped to provide an interfacing area for forming a cohesive bond between the two pieces 10 and 15. The area of overlap 8 is preferably kept as narrow as possible to avoid excess lithium but still provide a stable cohesive bond. The cohesive bond is formed at the area of overlap 8 using high pressure. The anode current collector 5 may extend over the area of overlap 8 to thereby stabilize and reinforce the cohesive bond between foils 10 and 15.

Figure 1B:
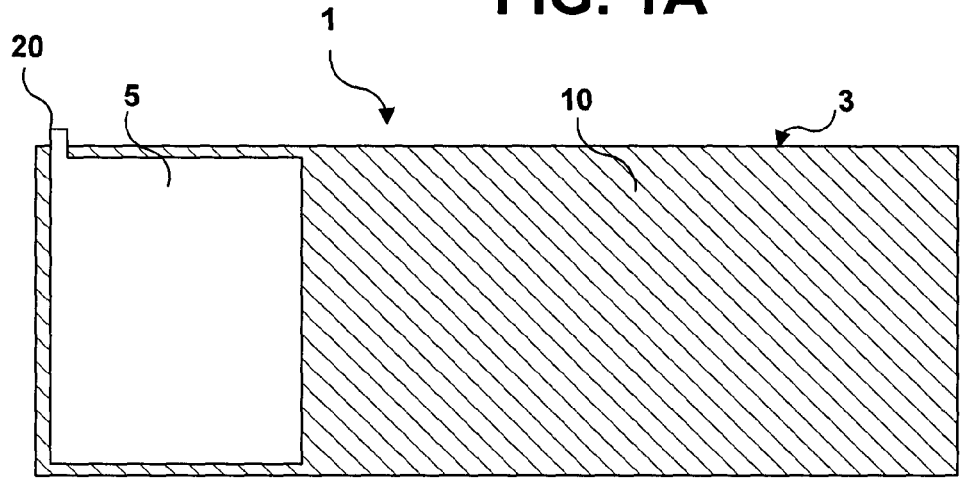
Figure 1C:
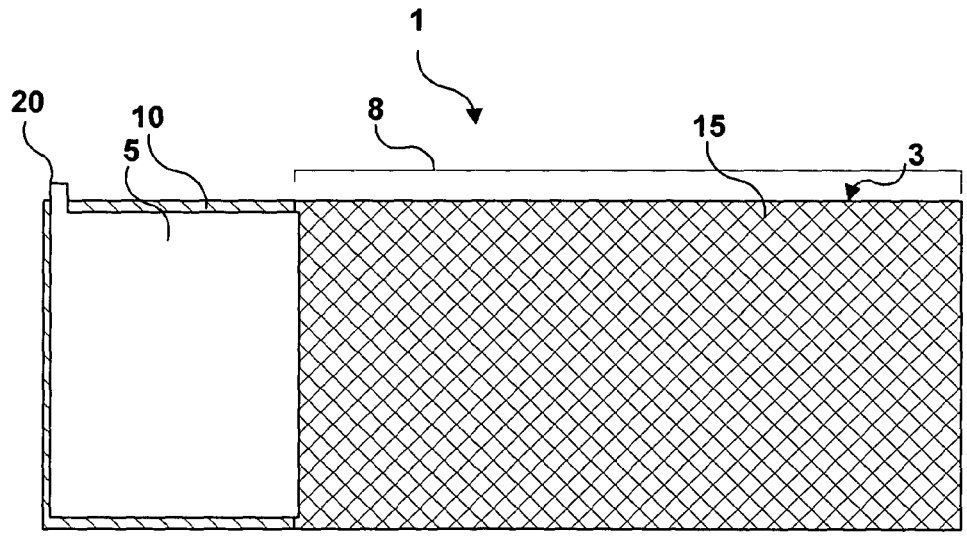

The anode subassembly 1 shown in FIG. 1A is intended for use in an anode-limited cell wherein the shorter thinner piece of alkali metal 15 forms the outer winding of a coiled electrode assembly formed when anode subassembly 1 is wound around an appropriately-sized mandrel with a cathode subassembly. An anode subassembly including a short, thin piece of alkali metal for forming the outer electrode winding and a long, thicker piece of alkali metal for forming the inner electrode windings is generally disclosed in the above-referenced jjpatnet application Ser. No. 10/123,495 now U.S. Pat. No. 6,805,719 filed 15 Apr. 2002 and entitled, "Balanced Anode Electrode" invented by Aamodt et al. Such an arrangement has the advantage of achieving a narrow anode material tolerance in an anode-limited cell, Alternative anode material arrangements may be used within the scope of the present invention for forming the alkali metal anode 3. For example, the anode 3 may be formed from a single elongated piece of alkali foil 10 attached to the solid anode current collector 5 as shown in FIG. 1B, wherein the elongated alkali foil 10 extends the entire length of anode subassembly 1. FIG. 1C illustrates yet another embodiment of an alkali metal anode arrangement. A long foil 10 is cohesively bonded to a shorter alkali metal foil 15 having a length corresponding to the linear distance of the inner coils of a wound electrode assembly. The solid current collector 5 is attached to long foil 10. The area of overlap 8 of the long and short foils 10 and 15 forms the inner coil windings of an electrode assembly, and the long foil 10, with solid current collector 5, forms the outer winding. In this embodiment, the long and short foils 10 and 15 may be provided with the same or different thickness.

In the embodiments of FIGS. 1A, 1B and 1C, the assembly process for producing anode subassembly 1 includes the step of pressing the alkali metal anode 3 onto solid anode current collector 5 to securely attach the anode current collector 5 to the anode material. Pressure of about 800 psi may be used to attach the anode current collector 5 to the anode 3. Anode current collector 5 is preferably pressed onto and thereby securely attached to the anode alkali metal at a location corresponding to the area that will become the outer surface of the outermost winding of a coiled electrode assembly.

The anode subassembly materials, namely solid current collector 5, and alkali metal anode 3, may be positioned as desired in a die. The dies is then placed between platens of a hydraulic press which presses the anode 3 onto the solid anode current collector 5. Preferably the pressed joint between the anode current collector 5 and the alkali metal anode 3 withstands a pulling force of about 0.25 lbs or greater, depending on the materials used, without delaminating to ensure that delamination does not occur during the expected useful life of the device.

Figure 2:
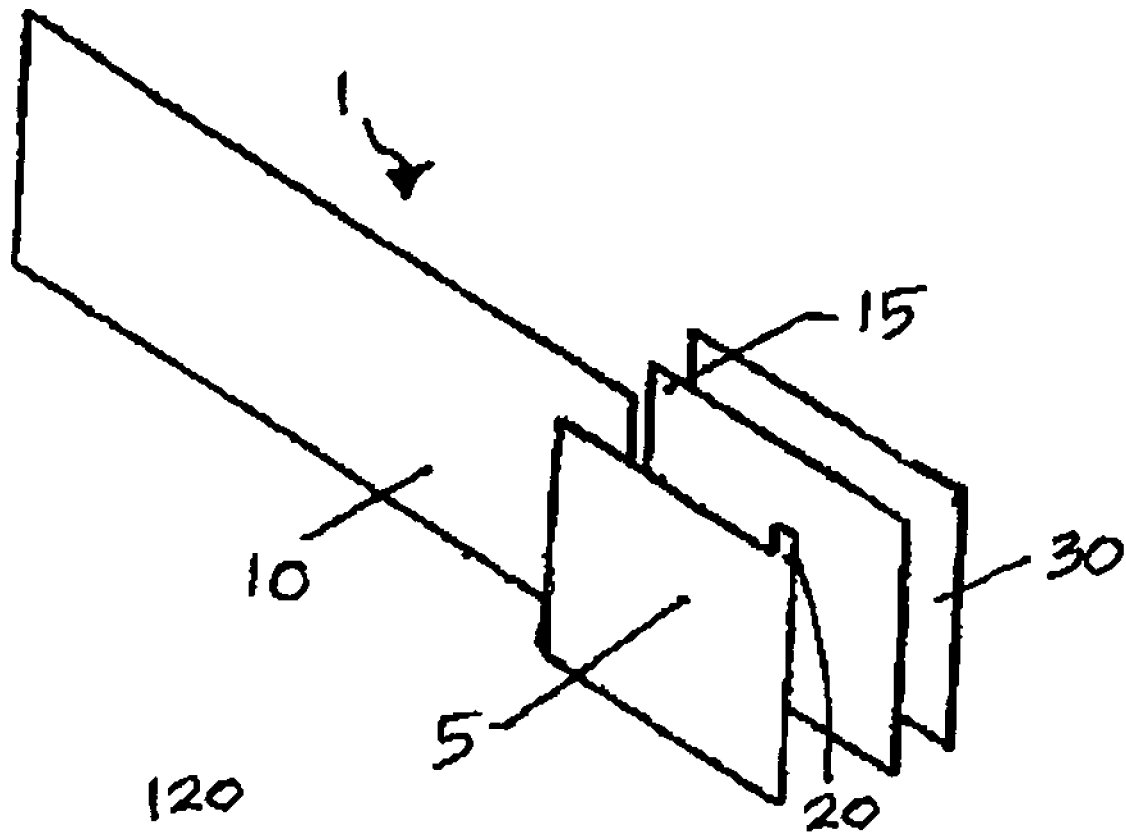
FIG. 2 is an exploded view of an anode subassembly according to one embodiment of the present invention.

FIG. 2 is an exploded view of an anode subassembly according to one embodiment of the present invention. The anode subassembly 1 shown in FIG. 2 includes solid anode current collector 5, elongated alkali metal foil 10, and shorter alkali metal foil 15, as described above in conjunction with FIG. 1A, and further includes a spacer 30. Spacer 30 is formed of a microporous, non-conductive film, such as a commercially available polyethylene or polypropylene film known for use as a battery separator material, which is chemically inert in the environment of the electrochemical cell. A preferred material for spacer 30 is a bilayer film including a microporous and non-woven layer of polypropylene.

Spacer 30 is pressed onto the anode alkali metal foils 10 and 15 on the opposite side of the anode foils 10 and 15 from anode current collector 5 such that the anode material is "sandwiched" between the current collector 5 and spacer 30. Spacer 30 and anode current collector 5 may be pressed onto the anode material in a single pressing step or in two separate pressing steps.

Spacer 30, solid anode current collector 5, and foils 10 and 15 may be arranged in a die which is placed between platens of a hydraulic press as described above. Spacer 30 may be pressed onto the anode foils 10 and 15 using a pressure of about 800 psi, for example. The pressure applied preferably deforms the anode metal into intimate contact with the spacer. When the bilayer film including microporous and non-woven layers indicated above is used for the spacer 30 material, the non-woven side is preferably placed against the anode alkali metal.

Spacer 30 may be shaped in the same general geometry as anode current collector 5, but is preferably dimensioned to be slightly larger than anode current collector 5 such that when the anode subassembly 1 is assembled, spacer 30 extends slightly beyond the edge of anode current collector 5 in all directions.

Figure 3:
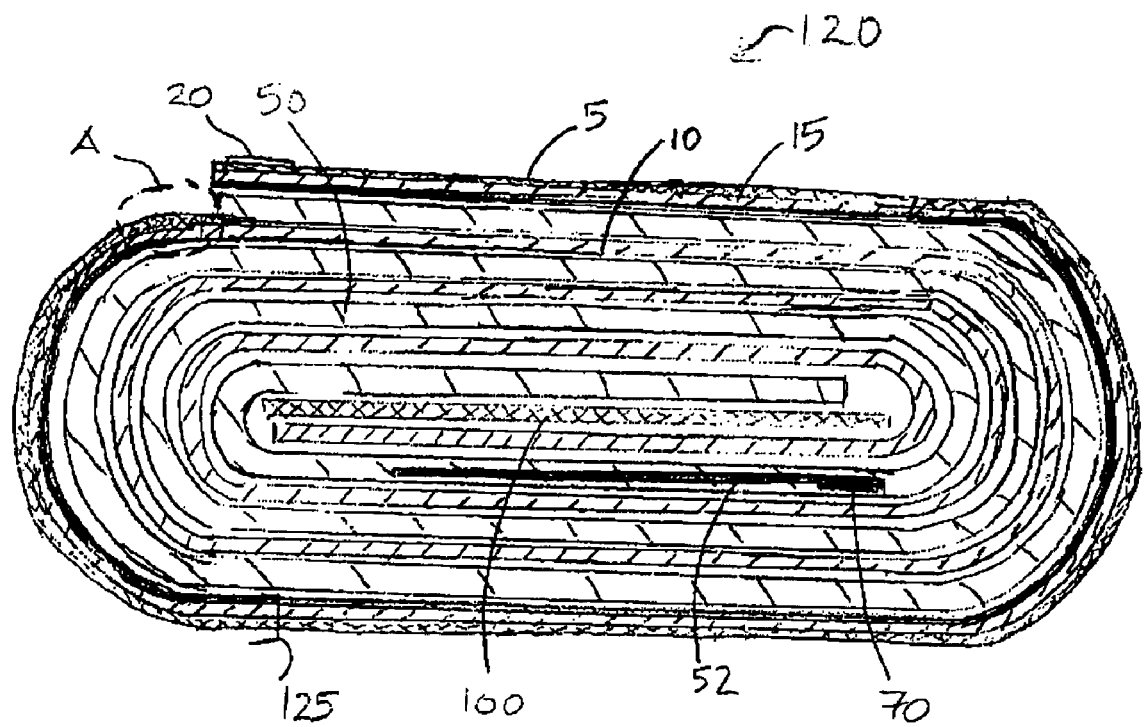
FIG. 3 is an end view of an electrode assembly including the anode subassembly of FIG. 2.

FIG. 3 is an end view of an electrode assembly including the anode subassembly of FIG. 2. Electrode assembly 120 is formed by winding anode subassembly 1 with a cathode subassembly around an appropriately sized mandrel 100. The cathode subassembly includes cathode material 50 and a cathode current collector 52. The cathode current collector 52 is formed from a conductive metal that is corrosion resistant at the cathode potential, such as titanium or aluminum. The cathode current collector may be provided with one or more projecting connector tabs 70 to allow connection to a cathode terminal. The cathode material 50 includes a solid reactive cathode ingredient, such as silver vanadium oxide (SVO), and may include other materials such as binding materials or conductivity enhancers as desired.

A method for winding the electrode assembly 120 may be performed as described in previously-referenced U.S. Pat. No. 5,486,215 or U.S. Pat. No. 6,051,038. The length of the anode subassembly 1 relative to the cathode subassembly is such that the outermost winding 125 of the electrode assembly 120 is formed by the anode subassembly 1. Moreover, the length of the elongated alkali metal piece 10 and the length of the shorter, thinner alkali metal piece 15 are such that the thicker piece 10 forms the inner windings of the electrode assembly 120 and the thinner piece 15 forms the outermost winding 125 of the assembly 120. Prior to coiling anode and cathode subassemblies together, one or both of anode subassembly I and the cathode subassembly may be enveloped in a sealed separator material, such as a commercially available microporous, single layer or multi-layer, film formed from a non-conductive material that is chemically inert in the environment of the electrochemical cell, such as polypropylene and/or polyethylene.

After the anode and cathode subassemblies have been properly wound, the mandrel 100 may be removed. The inner windings of the anode subassembly 1 formed by the thicker alkali metal piece 10 face cathode 50 on both sides.

The outermost winding 125 formed by the thin alkali metal piece 15 faces cathode 50 only on one side. The spacer 30 is positioned on the inner surface of the outermost winding 125, between cathode 50 and thin alkali metal piece 15 of the anode subassembly 1, such that spacer 30 provides a protective layer between the cathode material 50 and the anode current collector 5 when the anode alkali metal becomes depleted toward the end of cell discharge.

Spacer 30 may optionally extend into the inner windings of electrode assembly 120, however, in a preferred embodiment, spacer 30 extends along the inside of the outermost winding only so as to minimize the volume occupied by spacer 30.

Figure 4:
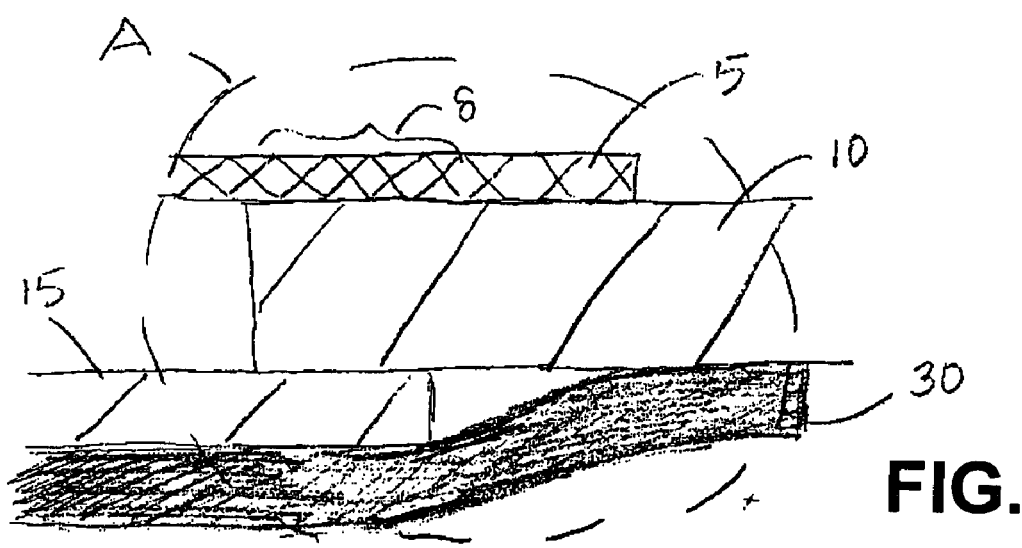
FIG. 4 is an enlarged view of the area indicated by the dashed circle labeled A in FIG. 3 providing a detailed view of the anode subassembly.

FIG. 4 is an enlarged view of the area indicated by the dashed circle labeled A in FIG. 3 providing a detailed view of anode subassembly 1. As described previously, the thick and thin foils 10 and 15 are pressed together with an area of overlap 8. The solid anode current collector 5 and spacer 30 are positioned on opposite sides of the anode alkali metal and may extend over the area of overlap 8 between thick and thin foils 10 and 15 to provide reinforcement of the cohesive bond between thick and thin foils 10 and 15.

The methods of the present invention reduce the risk of the cathode material from reaching the anode current collector and causing a short. The cathode 50 is less likely to push through a separator, if present, when the anode current collector is solid, i.e., without openings that create edges that the cathode 50 can press into and against. Separator material is less likely to tear when pressed against a solid anode current collector 5. The inclusion of a spacer 30 provides an additional protective layer for preventing a shorting failure mechanism. The spacer 30 is less likely to tear when pressed against the solid anode current collector 5 than when pressed against a perforated current collector, and the spacer 30 provides a barrier between the cathode 50, which may or may not be contained within a separator material, and the anode current collector 5. Thus, the anode subassembly provided by the present invention may enable the use of thicker cathode material, which can crack more severely than relatively thinner cathodes, with improved reliability and longer discharge life.

Assembly of the electrode assembly 120 into an exemplary battery is shown in FIGS. 5 through 7. In FIG. 5, a coil insulator 200 is placed onto the electrode assembly 120. The coil insulator includes a notch 202 to accommodate anode connector tab 20 and slit 206 to accommodate cathode connector tab 70. The electrode assembly 120 is also inserted into an insulating case liner 210. The case liner 210 preferably extends at its top edge above the edge of the electrode assembly 120 in order to provide an overlap with other insulating elements. If so, it may include a notch 211 on one side in order to allow the connection of the anode connector tab 20 to the case 220, for a case negative battery. The coil insulator 200 and case liner 210 are preferably made from a polyolefin polymer or a fluoropolymer such as PTFE or PCTFE. The electrode assembly 120 and case liner 210 are then inserted into a battery case 220, preferably made of stainless steel or titanium. The battery case 220 is shown as a prismatic, deep-drawn case in FIG. 5, however, the electrode assembly 120 may be placed in battery cases that are non-prismatic, e.g., having arcuate geometries, and/or shallow rather than deep.

One benefit of the anode subassembly included in the present invention is the potential reduction in cell defects due to handling of the anode subassembly during winding and the electrode assembly during cell manufacture. For example, when the electrode assembly 120 is inserted into case liner 210, improper alignment could cause a defect in the anode current collector 5 on the outer surface of electrode assembly 120. A solid anode current collector is more resistant to kinking or bending than a perforated current collector and is expected, therefore, to be less vulnerable to handling defects that could precipitate a shorting failure.

In FIG. 6 a case cover 230 and a pin insulator 240 are shown along with the electrode assembly 120 and case 220. The case cover 230 has a glassed in feedthrough 232 and feedthrough pin 233 extending through an aperture in the case cover 230 that has a bend 234 which is intended to place the feedthrough 232 in alignment with the cathode connector tab 70. The case cover 230 also has a fill port 236. Later in the battery assembly process, an appropriate electrolyte solution is introduced through the fill port 236, and the fill port 236 is sealed. The electrolyte solution can be an alkali metal salt in an organic solvent such as a lithium salt (i.e., 1.0M $LiClO_4$ or $LiAsF_6$) in a 50/50 mixture of propylene carbonate and dimethoxyethane. The sealing process may include, for example, making a first seal by pressing a plug into the aperture of the fill port 236 and making a second seal by welding a cap or disc over the fill port 236. Material utilized for leak checking hermetic seals may be included between the first and second seals.

The case cover 230 is made from stainless steel, and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber, which isolates the cathode connection. Additional insulation in the form of tubing or a coating may also be included on the feedthrough pin 233 and feedthrough 232 at locations that will not be welded to further insulate the feedthrough pin 233 and feedthrough 232. An optional cover insulator could be applied to the underside of the case cover 230 to provide additional insulation for the case cover 230.

The feedthrough pin 233 is welded to the cathode connector tab 70 as shown in FIG. 7. The anode connector tab 20 is welded to the side of the case 220 thereby making the metal case 220 one terminal or contact for the battery (i.e. a case negative design). The feedthrough pin 233 is then inserted through a split in the pin insulator 240 until it projects through the aperture 242 of the pin insulator 240. The electrode assembly 120 may be out of the case 220 during some of the welding and bending operations. The case cover 230 is then welded to the case 220 to seal the electrode assembly 120 in the case. The cathode connection is thoroughly isolated from the portions of the battery at anode potential, and the feedthrough connection is thoroughly isolated from stray particles of material from the cathode and from anode particles that may form during discharge of the battery.

Thus, an electrochemical cell has been disclosed having an anode subassembly designed to reduce the risk of a short occurring between the cathode and the anode. While the embodiments described herein have been directed toward a lithium-limited cell having a coiled electrode configuration, it is recognized that aspects of the present invention may be beneficially implemented in other types of cells, either anode-or cathode-limited cells, having a variety electrode configurations. The disclosed embodiments are therefore intended to be exemplary, rather than limiting, with regard to the following claims.

What is claimed is:

1. A coiled electrode for an electrochemical cell, comprising:
   a first segment of electrode material forming an outer winding of the coiled electrode, the first segment being of a first thickness between an outside surface and an inside surface and having first and second ends;
   a second segment of electrode material forming inner windings of the coiled electrode, the second segment being of a second thickness between an outside surface and an inside surface that is greater than the first thickness and having first and second ends; and
   a solid current collector of a conductive material overlaying the outside surface of both the first segment and the second segment of electrode material and dimensioned to be coextensive with the outer winding of the coiled electrode, the collector being directly connected to the second segment;
   wherein the first segment is joined directly to the second segment proximate one end of the first segment and proximate one end of the second segment,
   wherein the joined ends of the first and second electrode material segments overlap to form an overlapping region,
   a reinforcing member coupled to the overlapping region, wherein the reinforcing member comprises an alkali metal.

2. A coiled electrode according to claim 1, further comprising: a spacer member disposed on a portion of inside surface of the first segment of electrode material.

3. A coiled electrode according to claim 2, wherein said spacer member has a shape corresponding to the current collector and at least partially extends beyond a peripheral edge of the current collector.

4. A coiled electrode assembly according to claim 3, wherein said spacer member at least partially overlaps at least a portion of the overlapping region.

5. A coiled electrode according to claim 1, further comprising a dielectric separator disposed over at least an exposed surface of the current collector.

6. A coiled electrode according to claim 5, wherein said dielectric separator extends over substantially the outer winding of the coiled electrode.

7. The coiled electrode according to claim 6, wherein said dielectric separator further comprises: at least two layers of separator material.

8. A coiled electrode according to claim 7, wherein a peripheral edge of said at least two layers of separator material are sealed together to form a dielectric pouch around said electrode assembly.

9. A coiled electrode according to claim 1, wherein a portion of said current collector covers at least a portion of the overlapping region.

10. A coiled electrode according to claim 9, wherein said current collector is disposed closely adjacent to a terminal end of the outer winding.

11. A coiled electrode according to claim 1, wherein at least a portion of the current collector is disposed adjacent at least a portion of the overlapping region.

12. A coiled electrode according to claim 2, wherein said spacer member comprises at least two sheets of material.

13. A coiled electrode according to claim 1, wherein said elongated electrode assembly comprises a lithium material.

14. A coiled electrode according to claim 13, wherein said current collector comprises: a nickel material, a copper material, a titanium material, or an alloy thereof.

15. A coiled electrode according to claim 1, wherein said alkali metal comprises a lithium material.

* * * * *